(12) United States Patent
Trueb et al.

(10) Patent No.: US 7,264,431 B2
(45) Date of Patent: Sep. 4, 2007

(54) FASTENER FOR COVER MEMBER AND COVER ASSEMBLY COMPRISED THEREOF

(75) Inventors: Thomas W. Trueb, Ellington, CT (US); Steven R. Trueb, Ellington, CT (US)

(73) Assignee: Watertite Products, Inc., Collierville, TN (US)

(*) Notice: Subject to any disclaimer, the term of this patent is extended or adjusted under 35 U.S.C. 154(b) by 411 days.

(21) Appl. No.: 10/675,405

(22) Filed: Sep. 30, 2003

(65) Prior Publication Data

US 2005/0067019 A1    Mar. 31, 2005

(51) Int. Cl.
 *F16B 19/00* (2006.01)
(52) U.S. Cl. .................... 411/510; 411/458; 411/455
(58) Field of Classification Search ........ 411/508–510, 411/913, 386, 388, 389, 455, 450, 451, 490, 411/460
See application file for complete search history.

(56) References Cited

U.S. PATENT DOCUMENTS

| | | | | |
|---|---|---|---|---|
| 2,025,961 A | * | 12/1935 | Stone ......................... | 411/455 |
| 2,172,553 A | * | 9/1939 | Tripp ......................... | 411/455 |
| 2,328,823 A | * | 9/1943 | Mackenzie ................ | 138/158 |
| 3,272,059 A | * | 9/1966 | Lyday ........................ | 411/510 |
| 3,461,733 A | | 8/1969 | Peterson | |
| 3,605,201 A | | 9/1971 | Peterson | |
| 3,717,067 A | * | 2/1973 | Vick et al. ................. | 411/455 |
| 3,966,339 A | * | 6/1976 | Nemecek et al. ......... | 403/292 |
| 4,597,594 A | | 7/1986 | Kacalieff et al. | |
| 4,718,802 A | * | 1/1988 | Rockenfeller et al. ..... | 411/421 |
| 5,054,513 A | | 10/1991 | Trueb et al. | |
| 5,360,031 A | | 11/1994 | Trueb et al. | |
| 5,454,392 A | | 10/1995 | Trueb et al. | |
| 5,772,551 A | * | 6/1998 | Mabie ........................ | 474/256 |
| 5,810,534 A | * | 9/1998 | Carlisle et al. ............ | 411/455 |
| 5,842,319 A | * | 12/1998 | Ravetto ..................... | 52/715 |
| 5,901,739 A | | 5/1999 | Helmsderfer | |
| 2002/0108663 A1 | | 8/2002 | Lechuga | |

* cited by examiner

*Primary Examiner*—Flemming Saether
(74) *Attorney, Agent, or Firm*—Alston & Bird LLP

(57) ABSTRACT

A rigid fastener, for securing to one another adjacent portions of a cover member made of resiliently deformable material, has an end portion with an outward end section of relatively small outside diameter and an axially adjacent inward section of relatively large outside diameter. The end portion of the fastener is engagable in either of two positions in a corresponding recess formed into at least one of the adjacent portions of the cover piece, affording a high level of holding power in its filly inserted position and affording a low level of holding power in a partially inserted position.

10 Claims, 3 Drawing Sheets

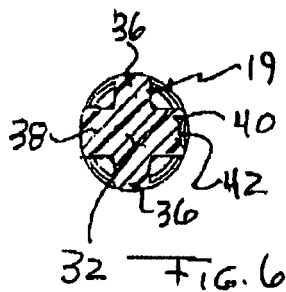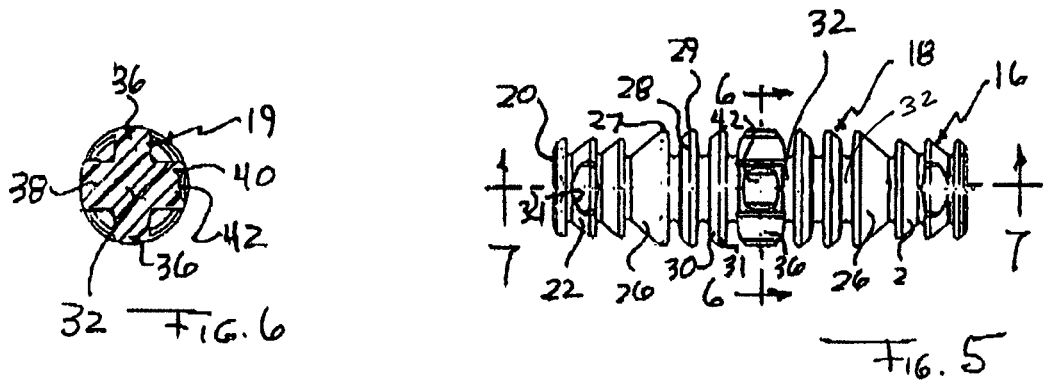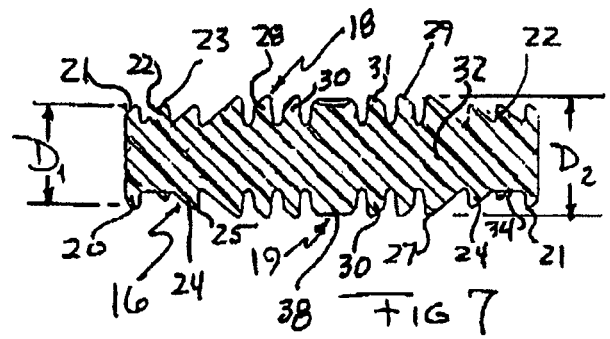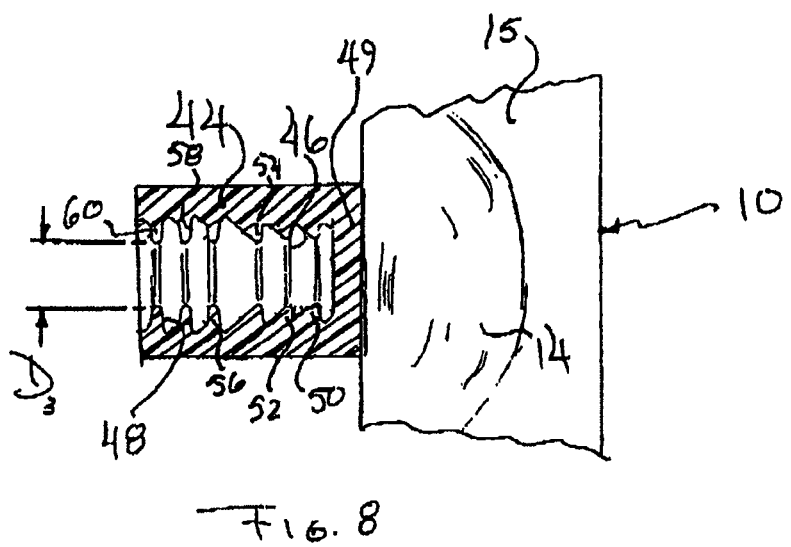

FASTENER FOR COVER MEMBER AND COVER ASSEMBLY COMPRISED THEREOF

BACKGROUND OF THE INVENTION

Regulations in place in many municipalities require the so-called "P-trap" assembly (i.e., the waste-water piping) under sinks and the like to be insulated so as to prevent scalding or abrasion injury from contact with metal surfaces that are hot, sharp, or rough. Wheelchair-bound individuals are at particular risk.

The patent art in the field is well developed, and provides a wide variety of covering members that are effective for providing the necessary protection. Many suitable products are commercially available as well.

The most effective and desirable P-trap insulating systems consist of two or three generally tubular pieces of resiliently yieldable synthetic resinous material, molded to fit over a corresponding piece or portion of the piping (i.e., being of generally J-shaped or generally L-shaped form to cover the J-bend and waste arm of the P-trap assembly, respectively). Each such covering piece is normally slit along its length to enable it to be placed readily upon the installed pipe section, following which it is of course necessary to secure the adjacent portions along the slit. The securement means should be quick and easy to apply, and tamperproof; it should not itself present sharp and potentially injurious elements, and should not detract from the aesthetics of the installation.

Among the variety of securement means that have in the past been provided are included common ratchet-acting plastic bands, applied about the cover piece or threaded through aligned tangential slot portions, as disclosed respectively in Trueb et al. U.S. Pat. Nos. 5,054,513 and 5,360,031. Elongate locking fasteners are disclosed in Trueb et al. U.S. Pat. No. 5,454,392, and various forms of interengaging tabs and cooperating slits or recesses, as well as threaded bolts screwed into apertures, are described in Helmsderfer U.S. Pat. No. 5,901,739. Lechuga U.S. Patent Application Publication No. 2002/0108663 describes a fastener comprised of a shank and a pair of enlarged end portions, which is intended for insertion into a pair of aligned apertures. The interior construction of the aperture is described to comprise enlarged grooves or box-like recesses, separated by an inwardly projecting diametrically reduced ring, which is specifically sized to retain a fastener of the kind set forth. Velcro elements, applied in various arrangements, are also among the variety of fasteners that have been used for interengageing flanges of pipe-covering members.

Prior art in other fields provides double-beaded coupling pieces and connectors for joining end portions of various structures to one another. For example, U.S. Pat. Nos. 3,461,733 and 3,605,201 describe coupling pieces having gripping heads on their opposite ends, for constructing continuous belts. A connector having a series of barbs at each end is provided in U.S. Pat. No. 4,597,594 for joining the ends of flexible hoses; and a connector having dual parallel biting edges at each end, used for construing an endless belt is disclosed in U.S. Pat. No. 5,772,551.

SUMMARY OF THE INVENTION

Despite the activity in the art indicated by the foregoing, a need exists for a fastener, and a cooperating insulating cover piece, by which adjacent portions of the cover piece can be joined to one another securely, quickly, and in a safe, aesthetic manner.

A need also exists for such a fastener and cover piece system that enable preassembly and temporary, light interengagement thereof, to permit the cover piece to be stored and transported without distortion from its normal shape and to permit accurate alignment and positioning on the pipe section prior to effecting full, semi-permanent engagement of the fasteners.

Satisfaction of the foregoing and related needs constitute the objects of the present invention, certain of which objects are attained by the provision of a rigid fastener, normally of generally cylindrical form and having a double-effect engagement portion at least at one end. The engagement portion is comprised of an axially outward end section, having a first effective outside diameter, and an axially adjacent inward section having a second effective outside diameter substantially larger than the first diameter. Each of the sections of the engagement portion is comprised of a plurality of circumstantially extending, mutually adjacent retaining elements (preferably three), which may be of circular barb-like form, engagable in mating recess sections formed into an adjacent portion of a resiliently yieldable cover member. The retaining elements of the outward end section of the engagement portion are formed to the first-mentioned diameter, and the retaining elements of the inward section arc formed to the second-mentioned diameter.

In preferred embodiments, at least a multiplicity of the retaining elements extend continuously about the engagement portion of the fastener, and taper (at least at their peripheries) in the outward direction. A double-effect engagement portion will usually be provided at both ends, with the fastener itself being symmetrical about a transaxial, medial plane between its opposite ends. The fastener may additionally include an intermediate, central portion, the effective outside diameter of which may or may not be larger than the effective diameter of the inward sections of the engagement portions, with certain benefits being realized in either case. The central portion may advantageously (e.g., to conserve material) be comprised of a multiplicity of elements extending generally radially outwardly relative to the longitudinal axis of the fastener.

Other objects of the invention are attained by the provision of a cover assembly comprised of a cover member made of resiliently yieldable material and having adjacent portions that are to be secured to one another, and a plurality of rigid fasteners constructed as herein described. At least one of the adjacent portions of the cover member will have a plurality of matingly configured recesses of generally circular cross section Formed therein, each recess comprising an inner section of relatively small effective inside diameter and an adjacent outer section of relatively large effective inside diameter, which inside diameters will be substantially equal, respectively, to the "first" and "second" diameters of the fastener sections so as to cause the engagement portion of the fastener to securely engage the recess of the cover member portion.

The difference between the first and second diameters of the fastener engagement portion sections (and hence between the relatively small and relatively large diameters of the cover member recess sections), will preferably be such that the outward end section of the fastener will fit in the outer section of the recess relatively loosely but with a degree of mechanical interference sufficient to avoid inadvertent disengagement. More specifically, the outer section of the recess may have a minimum inside diameter that is smaller than the effective diameter of the outward end section of the fastener engagement portion.

The cover member will normally comprise an elongate part of generally circular cross section, having a slit extending longitudinally therealong. In particular, it may be generally J-shaped or generally L-shaped to cover the J-bend and waste arm, respectively, of a P-trap assembly. The cooperating portion of the cover member will usually have a plurality of recesses formed into it, similar or identical to those in the first-mentioned portion and aligned therewith, and both of the opposite end portions of the fastener will be formed with a double-effect construction for securement thereof.

Each of the adjacent portions of the cover member will advantageously have a plurality of externally accessible finger-locating elements thereon, desirably in the form of indentations disposed in a region spaced peripherally (e.g., circumferentially) from the slit. One of the finger-locating elements will be aligned generally over the inner and of each of the recesses formed into the cover member portion, thereby facilitating securement of the adjacent portions with the fasteners spanning the slit therebetween.

In accordance with somewhat broader embodiments of the invention, the recesses in the cover member portion will comprise an inner section having a relatively small effective maximum cross-sectional dimension and an adjacent outer section having a relatively large effective maximum cross-sectional dimension; and the double-effect engagement portion of the fastener will comprise an axially outward end section having a first maximum outside dimension and an axially adjacent inward section having a second maximum outside dimension substantially larger than the first dimension. Each of the sections of the engagement portion will be securely engagable in a corresponding section of the recess formed into the cover member, the surfaces of the recess being configured to effect such interengagement. The outward end section of the fastener engagement portion will have at least one retaining element that is effectively of the "first" dimension, and the inward section of the engagement portion will have at least one retaining element that is effectively of the "second" dimension, which fastener dimensions will be substantially equal to the relatively small dimension and the relatively large dimension, respectively, of the recess sections, As a result, the engagement portion of the fastener can be engaged in the recess of the cover member portion, the difference between the dimensions of the fastener sections (and consequently, the difference between the recess section dimensions) being such that the outward end section of the fastener fits relatively loosely in the outer section of the recess but with a degree of mechanical interference sufficient to avoid inadvertent disengagement. In such embodiments, the outer section of the recess will generally have an effective minimum dimension that is smaller than the maximum outside dimension of the outward end section of the one end portion of the fastener.

BRIEF DESCRIPTION OF THE DRAWINGS

FIG. 5 is a plan view of the fastener of FIG. 4;

FIG. 6 is a transaxial sectional view of the fastener, taken along line 6-6 in FIG. 5;

FIG. 7 is a longitudinal (axial) sectional view of the fastener, taken along line 7-7 in FIG. 5;

FIG. 8 is a fragmentary sectional view of a lug formation on one of the cover piece portions, from which the fastener is removed, taken slightly below the surface along line 8-8 in FIG. 2, drawn to a greatly enlarged scale and showing the compound recess formed therein;

DETAILED DESCRIPTION OF THE PREFERRED AND ILLUSTRATED EMBODIMENT

Figure 1:
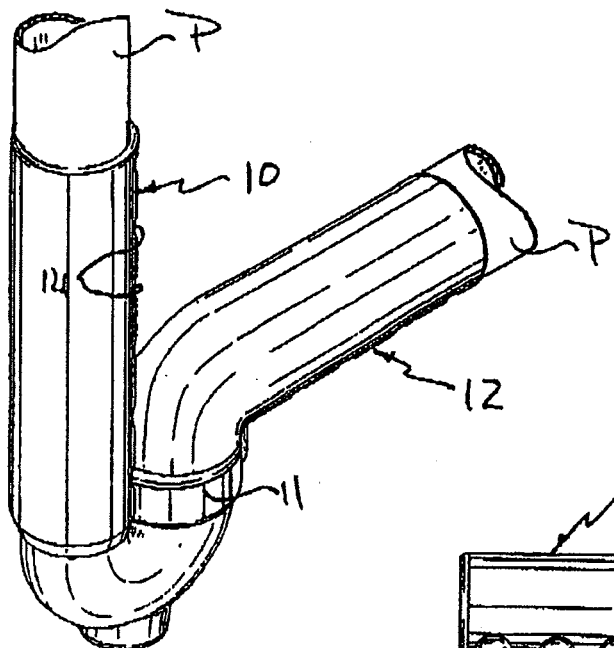
FIG. 1 is a perspective view of a pipe-insulating system, including a cover assembly embodying the present invention, installed on a P-trap assembly.
Figure 2:
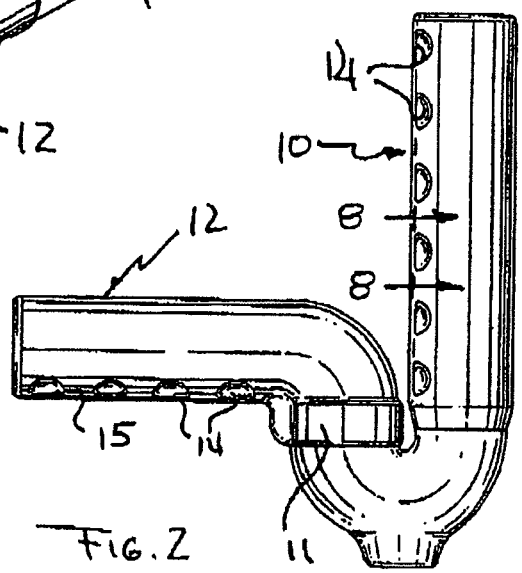
FIGS. 2 and 3 are side and rear elevational views, respectively, of the assembly shown in FIG. 1.
Figure 3:
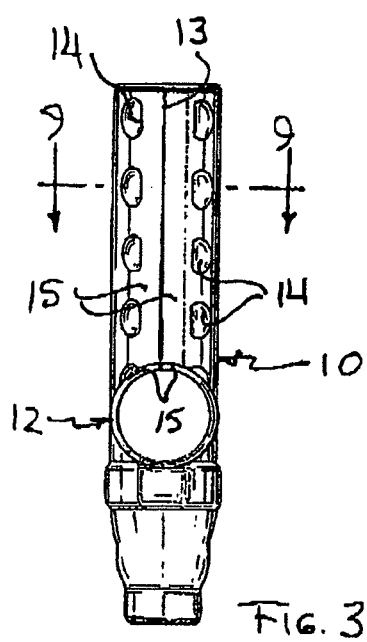
Figure 4:
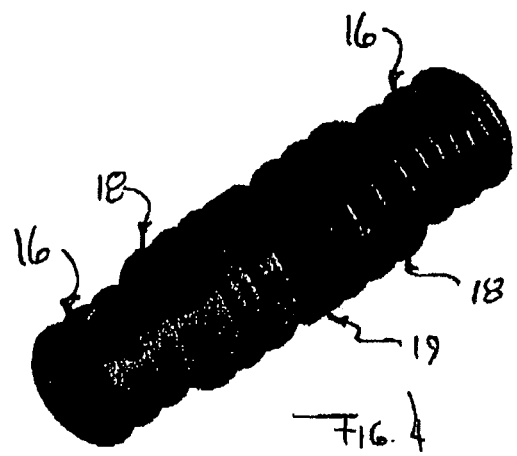
FIG. 4 is a perspective view of a fastener embodying the present invention and utilized in the cover assembly of FIG. 1, drawn to a greatly enlarged scale.

Turning now specifically to FIGS. 1-3 of the appended drawings, therein illustrated is a system for insulating the P-trap of undersink wastewater piping, into which system features embodying the present invention are incorporated. Apart from those features, the system may be the same as or similar to that which is described, for example, in the aforesaid Trueb et al. U.S. Pat. Nos. 5,054,513, 5,360,031, and 5,454,392, the disclosures of which are hereby incorporated by reference thereto.

Suffice to say that the system depicted comprises a J-shaped cover piece, generally designated by the numeral 10, and an L-shaped cover piece generally designated by the numeral 12, telescopically and rotatably interengaged at the hub portion 11 on the piece 12. Each of the cover pieces is fabricated from a resiliently yieldable synthetic resinous material, and is formed with a longitudinal slit 13 along its length to enable facile placement over the corresponding pipe section P comprising the P-trap assembly. Externally accessible finger-locating elements, in the form of indentations 14, are molded into the portions 15 along the slit 13 in a region spaced circumferentially therefrom.

With particular reference now to FIGS. 4-7, a fastener embodying the invention is shown in detail and comprises an elongate, generally cylindrical piece of rigid plastic material, which is symmetric about planes extending both medially, at a location between its opposite ends (i.e., on line 6-6 in FIG. 5), and also axially along the length of the fastener (i.e., on line 7-7 in FIG. 5). Each of the opposite end portions of the fastener comprises a dual-effect engagement portion, consisting of a relatively small diameter ($D_1$) axially outward nd section, generally designated by the numeral 16, and an axially adjacent inward section, generally designated by the numeral 18, of substantially larger diameter ($D_2$). Because engagement portions at the opposite ends of the fastener are, in this embodiment, virtually identical, only one such portion need be described in detail.

As will be noted, the smaller diameter, outward section 16 consists of three circumferentially extending, generally frustoconical barb elements 20, 22, 24, which taper in the axially outward direction and terminate at edge elements 21, 23, 25, respectively, lying on an imaginary cylinder of diameter $D_1$ (taken to be the effective outside diameter of the outward end section 16). Similarly, the inward section 18 consists of three circumferentially extending, generally frustoconical, barb elements 26, 28, 30, which also taper in the outward direction and terminate at edges 27, 29, and 31, disposed on an imaginary cylinder of diameter $D_2$ (taken to be the effective outside diameter of the inward section 18). The barb elements surround a central core 32 and, as will be described more fully below, serve as retaining elements.

The barb element 22 has a discontinuity at 34, which results from the provision of a flat thereat for the receipt of an ejector pin for effective discharge of the fastener from the mold in which it is formed. Needless to say, however, all of the barb elements may be circumferentially discontinuous or otherwise configured, provided of course they serve their intended purpose, as herein described. Indeed, it will be appreciated by those skilled in the art that objects of the invention may be obtained by the provision of retaining elements having a structure which differs considerably from those of the illustrated embodiment.

A central portion, generally designated by the numeral 19, is interposed between the engagement portions of the fastener and is of generally cruciform cross section, consisting of four mutually perpendicular radial elements 36, 38, 40, elements 36 being of identical, mirror-image form. A scallop 42, resulting from gating of the mold tooling, is present on element 40, and element 38 has a very slight reverse taper (not visually perceptible) for restraining the molded fastener to keep it in one of the tooling parts while the other part is being withdrawn, thereby ensuring controlled, positive ejection. The provision of sectorial spaces between the adjacent elements of the cruciform structure reduces the amount of resin from that which would be needed if, for example, the central portion were a full, disc-like structure (which may of course be the case). Forming the portion 19 with a diameter no larger than $D_2$ reduces somewhat the complexity of the cooperating recesses in the cover portion, and facilitates automatic feeding of the fasteners to the location of assembly with the cover member. On the other hand, forming the central portion 19 with a diameter (or dimension) larger than $D_2$, such that it extends outwardly beyond the mouth of the receiving recess, provides a base that can serve to further increase the stability of the fastener (inserted at one end) against any possibility of misorientation, to thereby better ensure alignment with a recess in the adjacent portion, for insertion thereinto.

Figure 9:
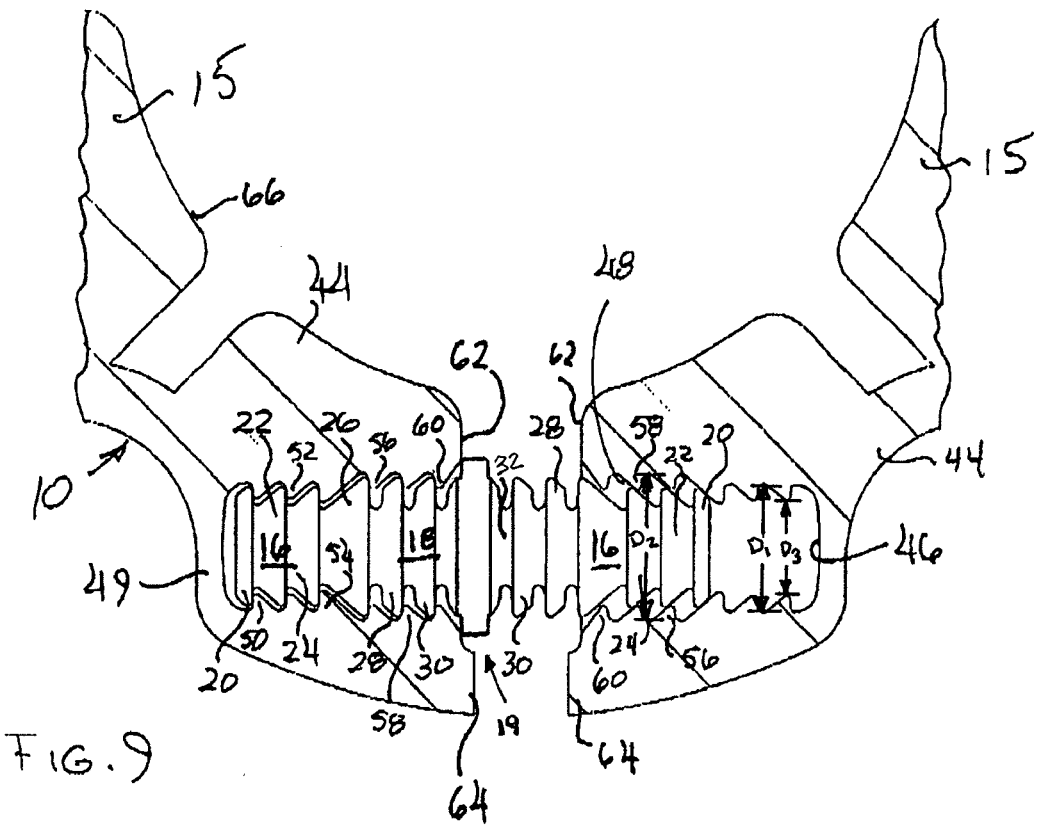
FIG. 9 is a fragmentary cross sectional view taken along line 9-9 of FIG. 3 and drawn to a greatly enlarged scale, showing the fastener fully inserted into a recess in one of the adjacent portions of the cover piece and partially inserted into a recess in the other.
Figure 10:
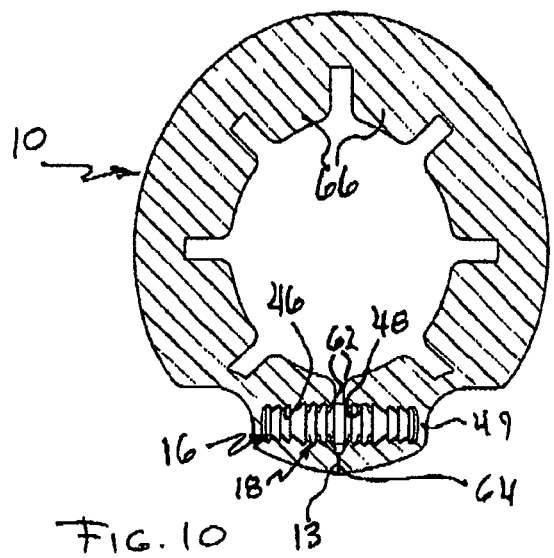
FIG. 10 is a cross sectional view also taken along line 9-9 of FIG. 3 and showing the fastener fully inserted into recesses in both adjacent portions.

Turning now to FIGS. 8 through 10 of the drawings, the cover piece 10 is formed with a pair of aligned lug formations 44 (only one of which is shown in FIG. 8) at each location along its length at which fastening is to be effected. One lug formation 44 of each pair is present on each of the adjacent portions 15 along the slit 13, and is aligned with one of the finger-locating indentations 14. Thus, it will be appreciated that a suitable number of lug pairs are provided at spaced intervals along the lengths of the slits 13 in the straight portions of both the I-shaped cover piece 10 and also the L-shaped cover piece 12.

As is best seen in FIGS. 9 and 10, paired recesses, extending into lug formations 44, align with one another across the slit 13. Each recess consists of a relatively small diameter (effective inside diameter) inner section 46, of diameter $D_1$ (taken at the valleys, or depressions, between the ring-like elements surrounding the section), and a relatively large diameter (effective inside diameter) outer section 48, of diameter $D_2$ (again taken at the valleys or depressions). The diameter ($D_3$), taken at the crests of the ring-like elements, corresponds to the diameter of the fastener core portion 32. It will be appreciated that the inner recess section 46 is thus dimensioned and configured to mate closely with the outer section 16 of the fastener engagement portion, and that the Outer recess section 48 is similarly dimensioned and configured to mate closely with the inner fastener section 18; maximum holding power will generally be afforded when (as illustrated) the configuration of the surfaces defining the compound recess substantially reproduces that of the surfaces defining the engagement portion of the fastener. It will be noted that inner recess section 46 is slightly elongated to provide a small gap adjacent the end wall 49 so as to maximize penetration of the fastener, particularly in accommodation of the resiliency of the material from which the cover piece is fabricated.

As depicted in FIG. 9, the engagement portion on the left end of the fastener is inserted to its full depth within the compound recess of a lug formation 44 on one of the portions 15 of the cover piece with which it is assembled; the right end engagement portion is only partially inserted. It will be noted that, in the fully inserted position, the barb elements 20, 22, 24, 26, 28, 30, on the two sections 16, 18 of the engagement portion of the fastener closely engage the mating internal ring elements 50, 52, 54, 56, 58, 60 circumscribing the recess, thereby producing a tight and strong securement typically exhibiting a holding force of about 50 pounds.

In the partially inserted position of the right end of the fastener, only the outward section 16 is disposed within the recess, lying at such depth that the barb elements 20, 22, 24 thereof loosely engage the circumferential ring elements 56, 58, 60 of the enlarged outer recess section 48. In that position the level of mechanical interference between the fastener and recess elements produces a holding power that may be barely measurable but sufficient to avoid inadvertent disengagement.

By way of specific example (and not limitation), the diameters $D_1$ and $D_2$ may be 0.213 and 0.250 inch, respectively, affording a diametrical difference between the effective outside diameters of the fastener sections 16, 18 (and accordingly, between the effective inside diameters of the recess sections 46, 48) of 0.037 inch. With a fastener core 32 of 0.145 inch diameter ($D_3$), corresponding to the diameter of the openings through the ring elements 56, 58, 60, the ring elements overlap the barb elements radially by 0.034 inch, providing the desired holding force in the partially inserted position.

The ability to conveniently and reliably loosely engage the fasteners with one of the portions of the cover piece (the fastener usually being fully engaged with the other portion) represents a primary advantage of the invention. Such temporary engagement will normally be carried out prior to packaging of the product for shipment, and serves to prevent distortion of the cover piece from its desired, as-manufactured shape; that is important not only from the standpoint of aesthetics but also to facilitate application. Only a gentle pulling force is needed for disengaging the loosely engaged outward sections of the fasteners, to permit spreading of the marginal portions for fitting of the cover piece over a pipe section.

In FIG. 10, a semi-permanent, fully secured relationship of both ends of the fastener is depicted. This is of course achieved simply by squeezing the adjacent portions of the cover piece together with sufficient force to drive the partially inserted engagement portions of the fasteners fully home, advantageously using the finger-receiving indentations provided at each fastener location (which not only afford a good grip and maximum force transmission, but also enable convenient "blind" access, from behind the pipe, as is normally necessary). Installation may be facilitated by preassembly of the cover piece on the pipe section, with the line of fasteners only lightly engaged in their associated recesses, prior to effecting insertion to full depth.

It will be noted from FIG. 10 that the confronting faces 62 of the aligned lug formations 44 are spaced slightly from one another, such that a narrow lip element 64, lying radially outwardly of and circumferentially beyond the faces 62 on each of the mutually adjacent cover piece portions, extends along the slit 13. With the fasteners fully seated in their corresponding recesses, therefore, the edges of the narrow lip elements 64 engage one another, producing a very tight and neat seam, free from buckling and distortion.

It will also be noted that a series of inwardly projecting rib segments 66 surrounds the passage through the cover piece. Such ribs are now conventional on covering members of the kind described and serve a standoff function, ensuring a good fit with the associated pipe and also enhancing the insulation effect It will be appreciated that the concepts disclosed and/or claimed herein are equally applicable to forms of covering pieces not illustrated, such as are used for insulating other components of undersink piping, e.g., the valve cover, the hot water supply tube, and the offset strainer. It will also be appreciated by those skilled in the art that the opposite ends of the fastener may be entirely different from one another. Indeed, one end portion may be permanently affixed to a one of the cooperating portions of the cover piece, such as by adhesive bonding or by molding it in place, in which event that end portion of the fastener need only be constructed to accommodate such a manner of affixation.

While the circumferential barb-like retaining elements on the fasteners described, and the mating ring elements within the recesses, combine the advantages of ready insertability and strong retentive forces, those elements may (as indicated above) take numerous other forms. Most broadly, it is only necessary, in accordance with the present invention, that the fastener have an engagement portion that includes two sections, a more outward one of which has an effective diameter that is smaller than an adjacent, more inward section, such that the fastener can provide at least two positions of engagement within a suitably formed cooperating recess. The fasteners of the invention are, as mentioned above, desirably fabricated from a rigid plastic resin, such a polypropylene, but metal fabrication may be preferred in certain instances.

Thus, it can be seen that the present invention provides a fastener, and a cooperating insulating cover piece, by which adjacent portions of the cover piece can be joined to one another securely, quickly, and in a safe, aesthetic manner. The fastener and cover piece enable preassembly and temporary, light interengagement to permit the cover piece to be stored and transported without distortion from its normal shape and to permit accurate alignment and positioning on the pipe section prior to effecting full, semi-permanent engagement.

Having thus described the invention, what is claimed is:

1. A rigid fastener for securing to one another adjacent portions of a cover member made of resiliently yieldable material, said fastener being of generally cylindrical form and having opposite end portions, at least one of said end portions being a double-effect engagement portion comprised of an axially outward end section, having a first inside diameter and a first effective outside diameter, and an axially adjacent inward section having a second inside diameter and a second effective outside diameter, wherein said second effective outside diameter is substantially larger than said first effective outside diameter, each of said sections of said engagement portion being comprised of a plurality of circumferentially extending, mutually adjacent retaining elements engageable in mating recess sections formed into a portion of a resiliently yieldable cover member, said retaining elements of said outward end section of said engagement portion being of said first effective outside diameter and said retaining elements of said inward section being of said second effective outside diameter, wherein said first inside diameter and said second inside diameter are substantially the same, and wherein crests of at least some of said retaining elements of said outward section are rounded for easy disengagement of said outward section from the cover member.

2. The fastener of claim 1 wherein at least a multiplicity of said retaining elements extends continuously about said engagement portion of said fastener.

3. The fastener of claim 1 wherein at least a peripheral edge portion of at least a multiplicity of said retaining elements tapers in the outward direction of said engagement portion, and said multiplicity of elements are of generally barb form.

4. The fastener of claim 1 wherein each of said sections of said engagement portion comprises three of said retaining elements.

5. The fastener of claim 1 wherein both of said opposite end portions of said fastener is a said double-effect engagement portion.

6. The fastener of claim 5 wherein said fastener is symmetrical about a trans-axial, medial plane between the opposite ends thereof.

7. The fastener of claim 6 additionally including a central portion disposed between said opposite end portions.

8. The fastener of claim 7 wherein said central portion of said fastener has an effective outside diameter not larger than said second effective outside diameter of said inward section of said engagement portions.

9. The fastener of claim 7 wherein said central portion of said fastener has an effective outside diameter larger than said second effective outside diameter of said inward section of said engagement portions.

10. The fastener of claim 7 wherein said central portion is comprised of a multiplicity of elements extending generally radially outwardly relative to the longitudinal axis of said fastener.

* * * * *